3,510,313
METHOD OF PRE-COOKING DRY BEANS
Keith H. Steinkraus, David B. Hand, and Jerome P. Van Buren, Geneva, and Robert L. La Belle, Phelps, N.Y., assignors to Cornell Research Foundation, Inc., Ithaca, N.Y., a corporation of New York
No Drawing. Filed May 10, 1965, Ser. No. 454,658
Int. Cl. A23l 1/20
U.S. Cl. 99—98    3 Claims

---

ABSTRACT OF THE DISCLOSURE

Pre-cooked dry beans are prepared by first hydrating dry beans, pre-cooking the hydrated beans in steam, immersing them in a sugar solution for 5 minutes, and then dehydrating them to obtain the advantages of preventing butterflying, baked bean flavor and color without baking, and good storage stability.

---

This invention relates to a method of producing pre-cooked dry beans so that the dry beans may be prepared for consumption at the time of use in a minimum of time.

In general, the long cooking time required to prepare dry beans for the table has placed them at a disadvantage with respect to competitive foods in the retail market. Canned baked beans, on the other hand, suffer competitively because of weight which adds to cost in shipment and storage. Dry beans of various kinds constitute a low-cost-nutritious food and a practical and economical method of providing pre-cooked dry beans is a highly desirable objective.

The present invention provides a method whereby dry beans of various kinds may be pre-cooked and then dehydrated, the pre-cooked dehydrated beans being adapted to be prepared for the table by covering with water and cooking for a moderate time, approximately thirty minutes. The method of the present invention is applicable to a wide variety of dry beans such as pea beans, marrow beans, black turtle soup beans, red kidney beans, and others.

Prior art attempts to produce pre-cooked dry beans have been unsatisfactory for various reasons. Problems are encountered in maintaining bean morphology and proper flavor and texture. There is a marked tendency of the beans to "butterfly," burst, and otherwise lose bean structure and identity, and in most cases the beans, after final preparation for use, are apt to be hard and grainy. In the case of dehydrated dry bean methods of the prior art rehydration has required too long a period so that the advantages of quick-cooking are lost.

In some prior art pre-cooking methds a freezing step is required which renders such methods relatively uneconomical. Certain prior art methods have proposed dipping the beans in sugar solutions to control bursting but such methods as are known do not produce a satisfactory product, the beans being hard and grainy upon rehydration and subject to butterflying to an objectionable degree.

In broad outline, the present method involves hydrating the dry beans by soaking in water, pre-cooking in steam, coating with sugar, and dehydrating. By treating beans in the foregoing general sequence of steps and within certain critical limits as to time, temperature and the like, pre-cooked dry beans are produced which may be finally prepared for consumption by merely covering the dehydrated beans with hot water and boiling for thirty minutes.

The process of the present invention is applicable to dry beans of various kinds as indicated earlier herein. Significant among the advantages of the present process are the following:

(1) Butterflying of the beans during cooking and dehydration which ordinarily results in loss of bean structure and identity is economically controlled.

(2) Baked bean flavor and color are produced without a baking step.

(3) The amount of brown color produced can be varied by varying the concentration of dextrose in the coating mixture.

(4) Storage beans with poor inherent cookability can be processed as taught herein to yield a quick-cooking product with uniform and characteristically smooth texture when rehydrated.

A representative method of practicing the present invention will now be set forth in detail by way of example. Reference will be had specifically to marrow beans and pea beans but substantially the same process is applicable to other varieties of dry beans with minor variations. The present invention is not limited in scope to the exact details set forth in the following representative method, the principles of the invention being as defined in the appended claims.

The initial step of the basic process is to hydrate the dry beans. In the case of pea beans this may be effectively accomplished by soaking the dry beans in water at 80° F. for five hours. In the case of marrow beans the necessary absorption of water is much improved by a 15 minute pre-steaming of the beans followed by soaking in water at room temperature (about 80° F.) for eight or nine hours. The pre-steaming of marrow beans may be omitted and complete hydration may be attained by soaking for about 15 hours at room temperature.

To secure maximum hydration in a minimum length of time it has been found that hydration is best carried on at elevated temperatures. For instance, in water at 180° F. hydration of pea beans immersed for time periods varying from 15 to 90 minutes produced hydration factors ranging from 1.69 to 2.0. The hydration factor is the ratio obtained by dividing the weight after hydration by the original starting weight of the dry beans. In the process of the present invention the beans must be well hydrated before cooking and the hydration factor should be in the neighborhood of 2.0. Hydration of pea beans for 5 hours at 80° F. will satisfy this requirement. In other words, the beans take up an amount of water approximately equal to their starting weight.

The next step in the process is pre-cooking the hydrated beans to a degree which eliminates the grainy texture of the beans while retaining the bean morphology. The cooking time and temperature in the pre-cooking step is believed to be of great significance in attaining the new and unusual overall result in the method of the present invention. By way of example, this may be accomplished by first draining the beans and then cooking the drained beans in steam at about 245° F. or 250° F. for approximately 90 minutes.

Following pre-cooking as above, the beans are immersed in a sugar solution for example, 20° Brix, at 160° F. for 5 minutes. The use of a hot sugar solution keeps the beans, which come to the sugar solution from the pre-cooker, hot until they go to the dryer. The sugar coating step may also be practiced by using powdered sugar in place of a separate sugar solution since the moisture on the surface of the beans will form a layer of dissolved sugar. The sugar coating is provided for the purpose of protecting the bean structure during subsequent processing. The principal difficulty which is obviated by means of the sugar coating is the opening up of the bean during drying. This is variously referred to in the art as bursting, butterflying or puffing. While the above specified time, temperature and sugar concentration are highly effective for the desired purpose, various adjustments of the time, temperature and sugar concentration relationships may be made. Sucrose, dextrose and lactose, the three most economical sugars, appear to give about equal control of butterflying. However, dextrose caramelizes more readily and provides a greater degree of browning in the final cooking. By selecting suitable proportions of sucrose and dextrose the exact degree of browning which is desired may be achieved.

The final step in the present process of producing precooked beans ready for market is dehydration. A final moisture content in the range of 8 to 10% is preferred for the pre-cooked beans of the present invention. It has been determined that in the case of beans which have been quickly hydrated in water at elevated temperatures a longer dehydration is required to reduce the moisture level to the required dehydration range.

Where the beans have been subjected to slow hydration at room temperature dehydration to a 9% moisture content can be accomplished in 50 minutes of drying time whereas rapidly hydrated beans required about 80 minutes at the same drying temperature to reduce the moisture content to the same level.

The drying times referred to here were effected in an atmosphere having drying and wet bulb temperatures of 200° F. and 110° F., respectively (relative humidity 7.5%) and an air velocity of 200 to 300 feet per minute down through a one inch deep bed of beans.

Beans prepared according to the foregoing method have been stored for one year without detectable deterioration. As indicated earlier herein, no special rehydration is required. The pre-cooked beans are merely placed in water and cooked for approximately thirty minutes.

We claim:
1. A method of preparing pre-cooked dry beans which comprises the steps of hydrating the dry beans to approximately twice their dry weight, draining the hydrated beans, cooking the same in an atmosphere of steam at about 250° F. for approximately 90 minutes, transferring the cooked beans while hot to a sugar solution of approximately 20° Brix at about 160° F. and immersing them for approximately 5 minutes, then dehydrating the beans to a moisture content of between 8 and 10%.

2. A method of preparing pre-cooked dry beans which comprises the steps of hydrating the dry beans to approximately twice their dry weight, draining the hydrated beans, cooking the same in an atmosphere of steam for approximately 90 minutes, immersing the cooked beans in a sugar solution of approximately 20° Brix at about 160° F. for approximately 5 minutes, then dehydrating the beans.

3. A method of preparing pre-cooked dry beans which comprises the steps of hydrating the dry beans to approximately twice their dry weight, cooking the same at about 250° F. for approximately 90 minutes, immersing the cooked beans in a sugar solution of approximately 20° Brix at about 160° F. for approximately 5 minutes, then dehydrating the beans to a moisture content of between 8 and 10%.

References Cited
UNITED STATES PATENTS

| | | | |
|---|---|---|---|
| 2,141,364 | 12/1938 | Robinson | 99—98 |
| 3,281,251 | 10/1966 | Templeton | 99—204 |
| 3,337,349 | 8/1967 | Savage | 99—204 |

A. LOUIS MONACELL, Primary Examiner

W. A. SIMONS, Assistant Examiner

U.S. Cl. X.R.

99—204